United States Patent
Liu et al.

(10) Patent No.: US 12,343,709 B2
(45) Date of Patent: Jul. 1, 2025

(54) HYDROGENATION CATALYST, PREPARATION PROCESS THEREOF AND USE THEREOF

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Li Liu, Liaoning (CN); Yunhai Yao, Liaoning (CN); Chengmin Yang, Liaoning (CN); Yang Li, Liaoning (CN); Weiyu Duan, Liaoning (CN); Jin Sun, Liaoning (CN); Rong Guo, Liaoning (CN); Yong Zhou, Liaoning (CN); Bumei Zheng, Liaoning (CN); Li Ding, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

( * ) Notice: Subject to any disclaimer, the term of this patent is extended or adjusted under 35 U.S.C. 154(b) by 261 days.

(21) Appl. No.: 17/755,231

(22) PCT Filed: Oct. 23, 2020

(86) PCT No.: PCT/CN2020/123395
§ 371 (c)(1),
(2) Date: Apr. 25, 2022

(87) PCT Pub. No.: WO2021/078282
PCT Pub. Date: Apr. 29, 2021

(65) Prior Publication Data
US 2022/0362751 A1 Nov. 17, 2022

(30) Foreign Application Priority Data

Oct. 25, 2019 (CN) .......................... 201911020915.8

(51) Int. Cl.
*B01J 23/75* (2006.01)
*B01J 6/00* (2006.01)
(Continued)

(52) U.S. Cl.
CPC ............. *B01J 27/051* (2013.01); *B01J 6/001* (2013.01); *B01J 21/04* (2013.01); *B01J 23/75* (2013.01);
(Continued)

(58) Field of Classification Search
CPC . B01J 6/001; B01J 21/04; B01J 21/066; B01J 21/12; B01J 21/08; B01J 37/0201;
(Continued)

(56) References Cited

U.S. PATENT DOCUMENTS 4,486,297 A 12/1984 Matsumoto et al.

FOREIGN PATENT DOCUMENTS

CN 101722014 A 6/2010
CN 102311766 A 1/2012
(Continued)

OTHER PUBLICATIONS

Sanders et al., Formation of cobalt-molybdenum sulfides in hydrotreating catalysts: a surface science approach, Applied Surface Science 144-145, (1999), 380-384.*
(Continued)

*Primary Examiner* — Smita S Patel
(74) *Attorney, Agent, or Firm* — NKL Law; Allen Xue

(57) ABSTRACT

A hydrogenation catalyst contains a hydrogenation catalyst carrier and an active hydrogenation component. The active hydrogenation component includes a Group VIB metal
(Continued)

sulfide and a Group VIII metal compound, and the molar proportion of a substance of the Group VIII metal compound that interacts with the Group VIB metal sulfide to the total amount of the Group VIII metal compound is 60-100%. The hydrogenation catalyst has a higher active metal sulfurizing degree and a higher number of type II active centers, and can be applied to the hydrogenation treatment process of oil products such as distillate oils and residual oils.

10 Claims, 3 Drawing Sheets

(51) Int. Cl.
  *B01J 21/04* (2006.01)
  *B01J 23/755* (2006.01)
  *B01J 27/051* (2006.01)
  *B01J 37/02* (2006.01)
  *B01J 37/04* (2006.01)
  *B01J 37/20* (2006.01)

(52) U.S. Cl.
  CPC ......... *B01J 23/755* (2013.01); *B01J 37/0201* (2013.01); *B01J 37/04* (2013.01); *B01J 37/20* (2013.01)

(58) Field of Classification Search
  CPC ........ B01J 37/04; B01J 37/20; B01J 37/0018; B01J 37/0205; B01J 37/0203; B01J 37/0207; B01J 37/086; B01J 37/088; B01J 37/22; B01J 37/28; B01J 2523/31; B01J 2523/41; B01J 2523/845; B01J 2523/847; B01J 23/75; B01J 23/755; B01J 23/882; B01J 23/883; B01J 27/051; B01J 27/0515
  USPC ....... 502/202, 204, 205, 206, 207, 208, 210, 502/211, 212, 228, 216, 219, 220, 221, 502/246
  See application file for complete search history.

(56) References Cited

FOREIGN PATENT DOCUMENTS

| CN | 102443412 A | 5/2012 |
| CN | 102465005 A | 5/2012 |
| CN | 104248964 A | 12/2014 |
| CN | 104588043 A | 5/2015 |
| CN | 105521791 A | 4/2016 |
| CN | 108014781 A | 5/2018 |
| CN | 109894125 A | 6/2019 |
| CN | 110252321 A | 9/2019 |
| RU | 2665484 C1 | 8/2018 |
| RU | 2675361 C1 | 12/2018 |

OTHER PUBLICATIONS

CN108014781-machine translation, Liu,—published May 2018.*
Okamoto, Yasuaki et al.; "A model catalyst approach to the effects of the support on Co—Mo hydrodesulfurization catalysts"; Catalysis Today; vol. 86, No. 1-4; Nov. 1, 2023; ISSN: 0920-5861; pp. 31-43.
Thomson Scientific; "XP002808645"; Database WPI, Week 201985; Year: 2017; pp. 1-3.

* cited by examiner

HYDROGENATION CATALYST, PREPARATION PROCESS THEREOF AND USE THEREOF

TECHNICAL FIELD

The present invention relates to a hydrogenation catalyst, more specifically an oil product hydrogenation catalyst. The present invention also relates to a preparation process for a hydrogenation catalyst and use thereof.

BACKGROUND TECHNOLOGY

The sulfur compounds contained in diesel fuel mainly include aliphatic sulfides, thioethers, dibenzothiophenes (DBT), alkylbenzothiophenes, alkyldibenzothiophenes, and the like. The desulfurization technology of oil products is divided into non-hydrodesulfurization and hydrodesulfurization (HDS), wherein the non-hydrodesulfurization technology mainly comprises adsorption desulfurization, oxidation desulfurization, extraction desulfurization, biological desulfurization and the like. Although there is a great process in the non-hydrodesulfurization technology, especially in the oxidation desulfurization that has the best application prospect, but the defects such as high operation cost, high oil product loss, high capital and equipment investment and the like exist, and there is a certain difficulty in the subsequent treatment of the oil product, so that the industrialization is difficult to be realized in a short time. The HDS technology is a process of adopting a desulfurization catalyst to react under the conditions of high temperature and high pressure to convert sulfide into $H_2S$ for separation. HDS technology is relatively mature compared to other desulfurization technologies. For oil products with high sulfur content, this technology can greatly reduce the sulfur content. Meanwhile, the HDS technology is flexible in operation and has high refined oil yield and good color, and can effectively remove sulfides such as thiophene and the like that are difficult to be removed. With the stricter and stricter requirements on the cleanness of diesel oil, the HDS technology becomes more and more important, and becomes an important means for improving the product quality of oil refining enterprises, and a great deal of research work is done at home and abroad.

The abroad relatively mature HDS technologies are mostly based on newly developed high-activity catalysts, such as STARS and NEBULA series catalysts of the American Albemarle company, CENTINEL series catalysts of the American Standard company, TK series catalysts of the Denmark Topsoe company, HR series catalysts of the French Institute of Petroleum, and the like. The STARS catalyst technology (class II active reaction center) is suitable for producing low-sulfur or ultra-low-sulfur clean fuels with the sulfur mass fraction of less than 50 µg/g, and those having been industrially applied mainly include KF-757 with Mo—Co as an active metal component and KF-848 catalysts with Mo—Ni as an active metal component, and the KF-757 and KF-848 catalysts show high hydrodesulfurization activity under different operation conditions. KF-757 is suitable for producing products with the sulfur mass fraction of less than 50 µg/g under medium and low pressure conditions, and KF-848 is suitable for producing clean fuels with sulfur mass fraction of less than 10 µg/g under medium and high pressure conditions.

Chinese patent application CN102465005A discloses a sulfurization process of a Class II active center diesel hydrodesulfurization catalyst. According to said process, in the sulfurization of the Class II active center hydrodesulfurization catalyst, the sulfurization is firstly performed at a higher pressure and a lower temperature, and then the sulfurization is then performed at a lower pressure and a higher temperature.

Chinese patent application CN102443412A discloses a method of starting up with an off-site presulfurization Class II active center hydrogenation catalyst, which comprises the following steps: (1) taking the off-site presulfurization Class II active center hydrogenation catalyst; (2) filling the off-site presulfurization Class II active center hydrogenation catalyst into a reactor at normal temperature and normal pressure, introducing a nitrogen gas to replace the air in the reaction system, then replacing the nitrogen gas with a hydrogen gas, and sealing with the hydrogen gas; (3) continuously adjusting the temperature of the reactor bed layers, introducing a start-up activation oil to wet the catalyst; (4) circulating the start-up activation oil in a closed loop in the reaction system, and continuously increasing the temperature to complete the start-up activation; (5) after the completion of the activation, adjusting the bed layers to the reaction temperature, and switching to the feedstock oil.

Chinese patent application CN102311766A discloses a method of starting up with a Class II active center hydrogenation catalyst, which comprises the following steps: (1) taking a Class II active center hydrogenation catalyst before the sulfurization; (2) filling the non-sulfurized Class II active center hydrogenation catalyst before the sulfurization into a reactor at normal temperature and normal pressure, introducing a nitrogen gas to replace the air in the reaction system, then replacing the nitrogen gas with a hydrogen gas, and sealing with the gas; (3) continuously adjusting the temperature of the reactor bed layers, introducing a sulfurization oil to wet the catalyst; (4) circulating the sulfurization oil in a closed loop in the reaction system, gradually injecting a sulfurization agent into the sulfurization oil, and continuously increasing the temperature to complete the sulfurization; (5) after the completion of the sulfurization, adjusting the bed layers to the reaction temperature, and switching to the feedstock oil.

SUMMARY OF THE INVENTION

The inventors of the present invention find that the method for increasing the number of the Class II active centers of the hydrogenation catalyst in the prior art is mainly to change the sulfurization process, and still has room for improvement. Therefore, the inventors of the present invention have assiduously studied and found a novel hydrogenation catalyst. The present invention has been completed based on this finding.

Without being limited by any theory, the inventors of the present invention believe that the active metals (such as metals of Group VIB and metals of Group VIII) of the hydrogenation catalyst exist in an oxidation state (such as the oxide of the metal of Group VIB and the oxide of the metal of Group VIII) before the sulfurization, wherein the oxide of the metal of Group VIB is easier to be sulfurized and the oxide of the metal of Group VIII is harder to be sulfurized, which is likely to cause a phenomenon that the metal of Group VIII in the sulfurization state (i.e., the sulfide of the metal of Group VIII) is wrapped by the metal of Group VIB in the sulfurization state (i.e., the sulfide of the metal of Group VIB), which causes the metal of Group VIII not to sufficiently exert its effect as auxiliary, and is not easy to generate Class II active centers, resulting in a decrease in the catalyst activity. The inventors of the present invention find that by means of impregnating and sulfurizing different active metals step by step, the metal of Group VIB is firstly impregnated on the support, then the support is presulfurized, and then the metal of Group VIII is impregnated on the sulfide, so that the metal of Group VIII can cover the surface of the metal of Group VIB in the sulfurization state, the effect of the metal of Group VIII as auxiliary can be fully exerted, the condition for the interaction between the metal of Group VIII and the metal of Group VIB can be created, the generation of class II active centers can be promoted, and the activity of the hydrogenation catalyst can be further improved.

Specifically, the present invention relates to the following aspects.

1. A hydrogenation catalyst, comprising a hydrogenation catalyst support and a hydrogenation active component, wherein said hydrogenation active component comprises (preferably is) a sulfide of the metal of Group VIB and a compound (for example at least one selected from a sulfide and an oxide, preferably an oxide) of the metal of Group VIII, and the molar ratio of the species of said metal of Group VIII interacting with said metal of Group VIB (for example, adjoining, laminating, covering, loading, adhering, mixing, interspersing, enwrapping or any combination thereof, especially said compound of the metal of Group VIII being loaded on said sulfide of the metal of Group VIB) to the total of said metal of Group VIII is 60-100% (preferably 70-100%, 80-100%, 90-100%, 90-98% or 95-98%).

2. The hydrogenation catalyst according to any of the above-mentioned or the afterward-mentioned aspects, wherein when one particle of said hydrogenation catalyst is observed with SEM-EDX, A/B=60-100% (preferably 70-100%, 80-100%, 90-98% or 95-98%), assuming that the molar ratio of said metal of Group VIII (as the element of the metal of Group VIII) to said metal of Group VIB (as the element of the metal of Group VIB), as measured upon observing the region where said sulfide of the metal of Group VIB is present, is A, and that the molar ratio of said metal of Group VIII (as the element of the metal of Group VIII) to said metal of Group VIB (as the element of the metal of Group VIB) of said hydrogenation catalyst is B.

3. The hydrogenation catalyst according to any of the above-mentioned or the afterward-mentioned aspects, wherein based on the total weight of the hydrogenation catalyst, the content by weight percent of said sulfide of the metal of Group VIB (as disulfide of the metal of Group VIB) is 2.2 wt %-33 wt %, preferably 10 wt %-20 wt %, and the content by weight percent of said compound of the metal of Group VIII (as oxide of the metal of Group VIII) is 0.2 wt %-12 wt %, preferably 3 wt %-6 wt %.

4. The hydrogenation catalyst according to any of the above-mentioned or the afterward-mentioned aspects, wherein said metal of Group VIB is selected from at least one of Mo and W, and said metal of Group VIII is selected from at least one of Co and Ni.

5. The hydrogenation catalyst according to any of the above-mentioned or the afterward-mentioned aspects, wherein upon the analysis of said hydrogenation catalyst (oxidation state) with the XPS energy spectrum, the molar ratio of the metal of Group VIB in +4 valent state to the total of said metal of Group VIB is 60%-90%, and/or, upon the analysis of the hydrogenation catalyst (sulfurization state) with the XPS energy spectrum, the molar ratio of the metal of Group VIB in +4 valent state to the total of said metal of Group VIB is 65%-100%, and/or, upon the analysis of the hydrogenation catalyst (the oxidation state and/or the sulfurization state) with the TEM electron microscope, the molar ratio of 3-5 layers in stack of the sulfide of the metal of Group VIB to the total of said sulfide of the metal of Group VIB is 60-95% (preferably 65%-90%, more preferably 65%-85%).

6. The hydrogenation catalyst according to any of the above-mentioned or the afterward-mentioned aspects, wherein said hydrogenation catalyst support is a porous inorganic refractory oxide, preferably selected from one or more of oxides of elements in Group II, Group III, Group IV and Group IVB in the Periodic Table of Elements, preferably selected from one or more of silica, alumina, magnesia, zirconia, titania, silica-alumina, silica-magnesia and alumina-magnesia, especially alumina.

7. The hydrogenation catalyst according to any of the above-mentioned or the afterward-mentioned aspects, which also comprises one or more modifying elements selected from B, P and F, and based on the total weight of said modifying element and said hydrogenation catalyst support, the content by the weight percentage of said modifying element (as the modifying element) is 0.5 wt %-10 wt %.

8. A process for preparing a hydrogenation catalyst, wherein said hydrogenation catalyst comprise a hydrogenation catalyst support and a hydrogenation active component, wherein said hydrogenation active component comprises (preferably is) a sulfide of the metal of Group VIB and a compound of the metal of Group VIII (for example at least one selected from a sulfide and an oxide, preferably an oxide), The preparation process comprises the following steps:
(1) impregnating the hydrogenation catalyst support (preferably isometrically) with an impregnation solution containing a metal of Group VIB, and then drying and sulfurizing to obtain a sulfurized material; and
(2) impregnating the sulfurized material (preferably isometrically) with an impregnation solution containing a metal of Group VIII, and optionally subsequently drying and/or calcining to obtain the hydrogenation catalyst.

9. The preparation process according to any of the above-mentioned or the afterward-mentioned aspects, wherein in step (1), the mass concentration of said metal of Group VIB (as the element of the metal of Group VIB) in said impregnation solution containing a metal of Group VIB is 0.1 g/mL-2.0 g/mL, and/or, in step (2) the mass concentration of said metal of Group VIII (as the element of the metal of Group VIII) in said impregnation solution containing a metal of Group VIII is 0.1 g/mL-1.0 g/mL, and/or, said impregnation solution containing a metal of Group VIB is used in such an amount that based on the total weight of the hydrogenation catalyst, the content by weight percent of said metal of Group VIB (as the element of the metal of Group VIB) is 1.3-20%, and/or, said impregnation solution containing a metal of Group VIII is used in such an amount that based on the total weight of the hydrogenation catalyst, the content by weight percent of said metal of Group VIII (as the element of the metal of Group VIII) is 0.16-9.5%.

10. The preparation process according to any of the above-mentioned or the afterward-mentioned aspects, wherein in step (1), the drying conditions comprise: the drying temperature is 90-200° C., the drying time is 3-6 hours, and/or, in step (1), the sulfurization conditions comprise: dry sulfurization or wet sulfurization, the sulfurization pressure is 3.2-6.4 MPaG, the sulfurization temperature is 250-400° C., the sulfurization time is 4-12 hours, the used amount of the sulfurizing agent is 1.1-2.0 times the theoretical amount.

11. The preparation process according to any of the above-mentioned or the afterward-mentioned aspects, wherein the drying conditions in step (2) comprise: under an inert atmosphere selected from an $N_2$ atmosphere, an inert gas atmosphere or a mixed atmosphere thereof, the drying temperature is 20-90° C., the drying time is 4-16 hours, and/or, the calcining conditions in step (2) comprise: under an inert atmosphere selected from an $N_2$ atmosphere, an inert gas atmosphere or a mixed atmosphere thereof, the calcining temperature is 200-500° C., the calcining time is 2-5 hours.

12. The preparation process according to any of the above-mentioned or the afterward-mentioned aspects, wherein in step (1), said impregnation solution containing a metal of Group VIB further contains a first auxiliary, said first auxiliary is at least one selected from an organic acid having at least two carboxyl groups (for example at least one selected from citric acid and ethylenediamine tetraacetic acid, preferably citric acid) and an organic alcohol having at least three hydroxy groups (for example at least one selected from glycerol and glucose, preferably glycerol), and the molar ratio of said first auxiliary to said metal of Group VIB (as the element of the metal of Group VIB) is 0.1-2.0 (preferably 0.2-0.8), and/or, in step (2), said impregnation solution containing a metal of Group VIII further contain a second auxiliary, said second auxiliary is at least one selected from an organic acid having at least two carboxyl groups (for example at least one selected from citric acid and ethylenediamine tetraacetic acid, preferably citric acid), an organic alcohol having at least one double bond (for example allyl alcohol) and an organic alcohol having at least two hydroxy groups (for example at least one selected from ethylene glycol, glycerol and glucose, preferably ethylene glycol), and the molar ratio of said second auxiliary to said metal of Group VIII (as the element of the metal of Group VIII) is 0.1-2.0 (preferably 0.2-0.8).

13. The preparation process according to any of the above-mentioned or the afterward-mentioned aspects, wherein said metal of Group VIB is selected from at least one of Mo and W, said metal of Group VIII is selected from at least one of Co and Ni, and/or, the hydrogenation catalyst support is a porous inorganic refractory oxide, preferably selected from one or more of oxides of elements in Group II, Group III, Group IV and Group IVB in the Periodic Table of Elements, preferably selected from one or more of silica, alumina, magnesia, zirconia, titania, silica-alumina, silica-magnesia and alumina-magnesia, especially alumina, and/or, the hydrogenation catalyst support is modified with one or more modifying elements selected from B, P and F, based on the weight of the modified hydrogenation catalyst support, the content by the weight percentage of said modifying element (as the modifying element) is 0.5 wt %-10 wt %.

14. A process for hydrogenating an oil product comprises the following steps:
Optionally sulfurizing the hydrogenation catalyst according to any of the above-mentioned or the afterward-mentioned aspects or the hydrogenation catalyst prepared according to the preparation process according to any of the above-mentioned or the afterward-mentioned aspects to obtain a sulfurized hydrogenation catalyst; and Hydrogenating the oil product in the presence of the hydrogenation catalyst or the sulfided hydrogenation catalyst.

15. The process for hydrogenating an oil product according to any of the above-mentioned or the afterward-mentioned aspects, wherein the oil product is selected from at least one of distillate oil and residual oil, especially diesel oil, and/or, said sulfurization conditions comprise: dry sulfurization or wet sulfurization, the sulfurization pressure is 3.2-6.4 MPaG, the sulfurization temperature is 250-400° C., the sulfurization time is 4-12 hours, the used amount of the sulfurizing agent is 1.1-2.0 times the theoretical amount, and/or, said hydrogenation conditions comprise: the hydrogen/oil volume ratio is 50:1-800:1, the catalyst/oil volume ratio is 0.25:1-2.0:1, the reaction pressure is 4.0-10.0 MPaG, the reaction temperature is 300-400° C., the volumetric space velocity is 0.5-4.0 $h^{-1}$.

DETAILED DESCRIPTION

Figure 1:
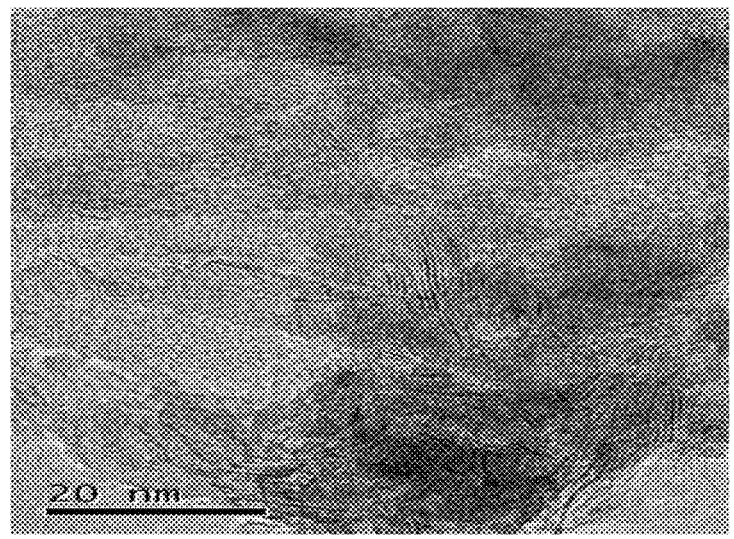
FIG. 1 is a high resolution transmission electron microscope photograph of the catalyst according to Example 5 of the present application.

Reference will now be made in detail to the present embodiments of the present invention, but it should be understood that the scope of the invention is not limited by the embodiments but is defined by the appended claims.

All publications, patent applications, patents, and other references mentioned in this specification are herein incorporated by reference in their entirety. Unless defined otherwise, all technical and scientific terms used herein have the same meanings as commonly understood by those skilled in the art to which this invention belongs. In case of conflict, the present specification, including definitions, will control.

When the specification derives a material, a substance, a process, a step, a device, an element and the like with the expression such as "known to those skilled in the art", "prior art", or the analogous term, it is intended that the subject matter so derived encompasses those having been conventionally used in the art at the time of filing this application, but also includes those which may not be so commonly used at the present time, but will become known in the art as being suitable for a similar purpose.

In the context of the present specification, for the SEM-EDX measurement, the measuring conditions comprise the acceleration voltage of 0.1-30 kV, the resolution of 1 nm, and the magnification of 25-1,000,000; the measuring steps comprise that the catalyst of the present invention is placed on a sample table for measurement, the EDX is adopted for scanning, the length and the width of the scanning area are in the range of 0.1-0.5 μm*0.1-0.5 μm, different areas are scanned, the mole contents of the metal of Group VIII and the mole contents of the metal of Group VIB from at least 20 photographs of EDX are counted, and the ratio of the average value of the mole contents of the metal of Group VIII to the average value of the mole contents of the metal of Group VIB is taken as A.

In the context of the present specification, the contents such as the content of the metal of Group VIB, the content of the metal of Group VIII, and the content of the modifying element in the hydrogenation catalyst are measured by ICP. The testing condition and steps comprise dissolving the sample with hydrofluoric acid and then taking the measurement.

In the context of the present specification, the XPS energy spectrum is used to analyze the molar ratio of the active metal (for example the metal of Group VIB or the metal of Group VIII) in +4 valent state to the total of the active metal in a hydrogenation catalyst. The measurement conditions of the XPS energy spectrum include: the vacuum degree of the analysis chamber is $\leq 5\times 10^{-10}$ mbar; the vacuum degree of the preparation chamber is $\leq 1\times 10^{-7}$ mbar; the double anode sensitivity is $4.5\times 10^6$, the energy resolution is 1.0 eV; and the monochromator sensitivity is $1.4\times 10^5$, and the energy resolution is 0.5 eV. The energy spectra of $Mo^{3d}$, $W^{4f}$, $Co^{2p}$ and $Ni^{2p}$ are fitted for the peak separation using XPPEAK Version 4.0 and the molar ratios are calculated from the peak areas (also called the sulfurization degree of the active metal, expressed with the $Mo^{4+}$ and $W^{4+}$ contents in the unit of %). The XPS energy spectrum analysis is performed on the hydrogenation catalyst before the sulfurization (referred to as the hydrogenation catalyst in the oxidation state) or on the hydrogenation catalyst after the sulfurization (referred to as the hydrogenation catalyst in the sulfurization state). Here, the sulfurization conditions include: sulfurizing with 30 mL/min of $H_2S$ for 2 hours at 320° C.

In the context of the present specification, the molar ratio of 3-5 layers in stack of the sulfide of the metal of Group VIB to the total of the sulfide of the metal of Group VIB is analyzed by the TEM electron microscopy, and the test conditions comprise: the type of the electron gun is LaB6, the acceleration voltage is 200 kV, the point resolution is 0.23 nm, the line resolution is 0.14 nm, the sample is placed on a sample table for testing, the layer number and the length of lamellar crystals on at least 20 TEM photographs are counted, and then the average length ($\bar{L}$) and the average number of the layers in stack ($\bar{N}$) of lamellar crystals of the sulfide of the metal of Group VIB are calculated respectively according to the following calculation equations (1) and (2). The TEM analysis is performed on the hydrogenation catalyst before the sulfurization (referred to as the hydrogenation catalyst in the oxidation state) or on the hydrogenation catalyst after the sulfurization (referred to as the hydrogenation catalyst in the sulfurization state). Here, the sulfurization conditions include: sulfurizing with 30 mL/min of $H_2S$ for 2 hours at 320° C.

$$\bar{L}=\Sigma_{m=1}^{k}L_m Q_{L_m}/\Sigma_{m=1}^{k}Q_{L_m} \quad (1)$$

$$\bar{N}=\Sigma_{m=1}^{k}N_m C_{N_m}/\Sigma_{m=1}^{k}N_m \quad (2)$$

In equations (1) and (2), $L_m$ is the length of the lamellar crystal m; $Q_{L_m}$ is the total number of the lamellar crystals having a length of $L_m$; $N_m$ is the number of the layers in stack of the lamellar crystal m; $C_{N_m}$ is the number of lamellar crystals having a layer number of $N_m$; k is the total number of stripes in the statistical regions.

All percentages, parts, ratios, and the like referred to within this specification are by weight and pressures are gauge pressures unless explicitly indicated.

In the context of this specification, any two or more embodiments of the present invention may be combined in any combination, and the resulting technical solution is part of the original disclosure of this specification and is within the scope of the present invention.

According to one embodiment of the present invention, there is provided a hydrogenation catalyst, which comprises a hydrogenation catalyst support and a hydrogenation active component.

According to one embodiment of the present invention, the hydrogenation active component comprises a sulfide of the metal of Group VIB and a compound of the metal of Group VIII. Preferably, the hydrogenation active component is a sulfide of the metal of Group VIB and a compound of the metal of Group VIII. Herein, as said compound of the metal of Group VIII, specifically for example, at least one selected from a sulfide and an oxide, preferably an oxide can be enumerated.

According to one embodiment of the present invention, as said metal of Group VIB, specifically at least one selected from Mo and W can be enumerated.

According to one embodiment of the present invention, as said metal of Group VIII, specifically at least one selected from Co and Ni can be enumerated.

According to one embodiment of the present invention, the molar ratio of the species of said metal of Group VIII interacting with said metal of Group VIB to the total of said metal of Group VIII is generally 60-100%, preferably 70-100%, 80-100%, 90-100%, 90-98% or 95-98%. Herein, as said interaction, specifically for example, said compound of the metal of Group VIII and said sulfide of the metal of Group VIB adjoining (for example, the region where the compound of the metal of Group VIII is present and the region where the sulfide of the metal of Group VIB is present have the common boundary in the plane direction), laminating (for example, the compound of the metal of Group VIII and the sulfide of the metal of Group VIB are alternatively arranged layer by layer in the vertical direction), covering (for example, the compound of the metal of Group VIII covering at least a part of the surface of the sulfide of the metal of Group VIB, or vice versa), loading (for example, the compound of the metal of Group VIII uniformly or non-uniformly adhering to the surface/interior of the sulfide of the metal of Group VIB used as the support), mixing (for example mixing the compound of the metal of Group VIII and the sulfide of the metal of Group VIB at a molecular level), interspersing (for example, the compound of the metal of Group VIII and the sulfide of the metal of Group VIB forming sea island-like separate structures), or any combination thereof, can be enumerated. Preferably, said compound of the metal of Group VIII is loaded on said sulfide of the metal of Group VIB.

According to one embodiment of the present invention, the zone where said sulfide of the metal of Group VIB is present can be observed when one particle of said hydrogenation catalyst is observed with SEM-EDX. The number of the regions may be one or more than one. Upon observing a region where the sulfide of the metal of Group VIB is present, said compound of the metal of Group VIII can be detected simultaneously in said region and the respective contents of said sulfide of the metal of Group VIB and said compound of the metal of Group VIII in said region can be measured. Hereby, assuming that the molar ratio of said metal of Group VIII (as the element of the metal of Group VIII) to said metal of Group VIB (as the element of the metal of Group VIB) as measured in the region is A, and that the molar ratio of said metal of Group VIII (as the element of the metal of Group VIII) to said metal of Group VIB (as the element of the metal of Group VIB) of said hydrogenation catalyst is B, A/B is generally 60-100%, preferably 70-100%, 80-100%, 90-100%, 90-98% or 95-98%. According to this embodiment of the present invention, A/B represents the ratio of the species of said metal of Group VIII interacting with said metal of Group VIB relative to the total of said metal of Group VIII. The larger the value of this ratio, the higher the ratio of the species of the metal of Group VIII interacting with the metal of Group VIB, indicating a higher proportion of class II active centers.

According to one embodiment of the present invention, based on the total weight of the hydrogenation catalyst, the content by weight percent of said sulfide of the metal of Group VIB (as the disulfide of the metal of Group VIB) is 2.2 wt %-33 wt %, preferably 10 wt %-20 wt %.

According to one embodiment of the present invention, based on the total weight of the hydrogenation catalyst, the content by weight percent of said compound of the metal of Group VIII (as the oxide of the metal of Group VIII) is 0.2 wt %-12 wt %, preferably 3 wt %-6 wt %.

According to one embodiment of the present invention, upon the analysis of the hydrogenation catalyst (oxidation state) with the XPS energy spectrum, the molar ratio of the metal of Group VIB in +4 valent state to the total of said metal of Group VIB is 60%-90%. Herein, the so-called oxidation state primarily means that the metal of Group VIII is present in an oxidation state without being sulfurized.

According to one embodiment of the present invention, upon the analysis of the hydrogenation catalyst (sulfurization state) with the XPS energy spectrum, the molar ratio of the metal of Group VIB in +4 valent state to the total of said metal of Group VIB is 65%-100%. Herein, the so-called sulfurization state primarily means the conversion of the metal of Group VIII to the sulfurization state.

According to one embodiment of the present invention, upon the analysis of the hydrogenation catalyst with the TEM electron microscope, the molar ratio of 3-5 layers in stack of the sulfide of the metal of Group VIB to the total of said sulfide of the metal of Group VIB is generally 60-95%, preferably 65%-90%, more preferably 65%-85%. Herein, the hydrogenation catalyst is present in the oxidation state or the sulfurization state, preferably the sulfurization state.

According to one embodiment of the present invention, the hydrogenation catalyst support is a support conventionally used in the art, for example a porous inorganic refractory oxide. Preferably, the hydrogenation catalyst support is selected from one or more of oxides of elements in Group II, Group III, Group IV and Group IVB in the Periodic Table of Elements, preferably selected from one or more of silica, alumina, magnesia, zirconia, titania, silica-alumina, silica-magnesia and alumina-magnesia, especially alumina.

According to one embodiment of the present invention, according to circumstances, the hydrogenation catalyst can also comprise one or more modifying elements selected from B, P and F, and based on the total weight of said modifying element and said hydrogenation catalyst support, the content by the weight percentage of said modifying element (as the modifying element) is 0.5 wt %-10 wt %.

According to one embodiment of the present invention, the hydrogenation catalyst support may be modified as required, for example, with at least one modifying element such as B, P, and F. The modification can be carried out according to a method conventionally known in the art. In addition, based on the weight of the modified hydrogenation catalyst support, the content by the weight percentage of said modifying element (as the modifying element) is generally 0.5 wt %-10 wt %.

According to one embodiment of the present invention, the hydrogenation catalyst may be manufactured by a preparation process. By way of example, the preparation process may comprise the following steps:
(1) impregnating the hydrogenation catalyst support with an impregnation solution containing a metal of Group VIB, and then drying and sulfurizing to obtain a sulfurized material; and
(2) impregnating the sulfurized material with an impregnation solution containing a metal of Group VIII, and optionally subsequently drying and/or calcining to obtain the hydrogenation catalyst.

According to the embodiment of the present invention, without being limited by any theory, the inventors of the present invention believe that, in the preparation process of the hydrogenation catalyst, in step (1), firstly impregnating with the metal of Group VIB, drying, and then directly sulfurizing without calcining, can weaken the interaction between the support and the active metals, and facilitate the sulfurization of the metal of Group VIB, therefore the content of the metal of Group VIB in +4 valent state is increased, and the proportion of 3-5 layers in stack of sulfide is increased. Moreover, after the metal of Group VIII is impregnated, more metals of Group VIII can be interacted with the metal of Group VIB, thereby more Class II active centers are formed, and the activity of the hydrogenation catalyst is improved.

According to one embodiment of the present invention, the impregnation may be carried out according to any method conventionally known in the art, but from the viewpoint of convenience, it is preferable to use an isometrical impregnation.

According to one embodiment of the present invention, said impregnation solution containing a metal of Group VIB of step (1) may be prepared according to methods conventionally known in the art, such as by using phosphate or ammonium salt solutions and the like. In addition, the mass concentration of said metal of Group VIB (as the element of the metal of Group VIB) in said impregnation solution is generally 0.1 g/mL-2.0 g/mL.

According to one embodiment of the present invention, said impregnation solution containing a metal of Group VIB is used in such an amount that based on the total weight of the hydrogenation catalyst, the content by weight percent of said metal of Group VIB (as the element of the metal of Group VIB) is 1.3-20%.

According to one embodiment of the present invention, said impregnation solution containing a metal of Group VIB of step (2) may be prepared according to methods conventionally known in the art, for example generally by using nitrate, acetate, sulphate solutions and the like. In addition, the mass concentration of said metal of Group VIII (as the element of the metal of Group VIII) in said impregnation solution is generally 0.1 g/mL-1.0 g/mL.

According to one embodiment of the present invention, said impregnation solution containing a metal of Group VIII is used in such an amount that based on the total weight of the hydrogenation catalyst, the content by weight percent of said metal of Group VIII (as the element of the metal of Group VIII) is 0.16-9.5%.

According to one embodiment of the present invention, in step (1), the drying conditions comprise: the drying atmosphere is generally air, the drying temperature is 90-200° C., and the drying time is 3-6 hours.

According to one embodiment of the present invention, in step (1), the sulfurization conditions comprise: dry sulfurization or wet sulfurization, the sulfurization pressure is 3.2-6.4 MPaG, the sulfurization temperature is 250-400° C., the sulfurization time is 4-12 hours, the used amount of the sulfurizing agent is 1.1-2.0 times the theoretical amount.

According to one embodiment of the present invention, in step (2), the drying is an optional step, which may or may not be carried out as desired. When performed, the drying conditions comprise: under an inert atmosphere selected from an $N_2$ atmosphere, an inert gas atmosphere or a mixed atmosphere thereof, the drying temperature is 20-90° C., and the drying time is 4-16 hours.

According to one embodiment of the present invention, in step (2), the calcining is an optional step, which may or may not be carried out as desired. When performed, said calcining conditions comprise: under an inert atmosphere selected from an $N_2$ atmosphere, an inert gas atmosphere or a mixed atmosphere thereof, the calcining temperature is 200-500° C., the calcining time is 2-5 hours.

According to one embodiment of the present invention, in step (1), said impregnation solution containing a metal of Group VIB further contains a first auxiliary. As said first auxiliary, specifically for example, at least one selected from an organic acid having at least two carboxyl groups and an organic alcohol having at least three hydroxy groups can be enumerated. Herein, as said organic acid, for example, at least one selected from citric acid and ethylenediamine tetraacetic acid, preferably citric acid can be enumerated. As said organic alcohol, for example, at least one selected from glycerol and glucose, preferably glycerol can be enumerated.

According to one embodiment of the present invention, the molar ratio of said first auxiliary to said metal of Group VIB (as the element of metal of Group VIB) is generally 0.1-2.0, preferably 0.2-0.8.

According to one embodiment of the present invention, in step (2), said impregnation solution containing a metal of Group VIII further contains a second auxiliary. As said second auxiliary, specifically for example, at least one selected from an organic acid having at least two carboxyl groups, an organic alcohol having at least one double bond, and an organic alcohol having at least two hydroxy groups can be enumerated. Herein, as said organic acid, for example, at least one selected from citric acid and ethylenediamine tetraacetic acid, preferably citric acid can be enumerated. As said organic alcohol, for example, at least one selected from allyl alcohol, ethylene glycol, glycerol and glucose, preferably at least one selected from allyl alcohol and ethylene glycol can be enumerated.

According to one embodiment of the present invention, the molar ratio of said second auxiliary to said metal of Group VIII (as the element of metal of Group VIII) is generally 0.1-2.0, preferably 0.2-0.8.

According to the embodiment of the present invention, without being limited by any theory, the inventors of the present invention believe that, the addition of said first auxiliary may help to increase the dispersity of active metals, weaken the interaction between the support and the active metals, facilitate the generation of 3-5 layers in stack of sulfide, and further facilitate the generation of more Class II active centers that have high hydrodesulfurization activity, and thereby the hydrodesulfurization activity of the catalyst is improved. In addition, the addition of said second auxiliary makes its polar functional group react with the metal of Group VIII and makes its nonpolar moiety interact with the sulfide of the metal of Group VIB on the catalyst intermediate, which facilitate the binding between the metal of Group VIII and the sulfide of the metal of Group VIB, thereby further increase the amount of the Co—Mo—S active phase in the catalyst, and facilitate the generation of more Class II active centers that have high hydrodesulfurization activity, and thereby the hydrodesulfurization activity of the catalyst is improved.

According to one embodiment of the present invention, the present invention also relates to a process for hydrogenating an oil product, comprising the steps of:

Optionally sulfurizing any hydrogenation catalyst as described hereinbefore to obtain a sulfurized hydrogenation catalyst (referred to as a pre-sulfiding step); and Subjecting the oil product to the hydrogenation in the presence of the hydrogenation catalyst or the sulfurized hydrogenation catalyst (referred to as a hydrogenation step).

According to the embodiment of the present invention, the pre-sulfurization step is an optional step, which may or may not be carried out as desired but is preferably carried out.

According to one embodiment of the present invention, the oil product is selected from at least one of a distillate oil and a residual oil, in particular diesel oil.

According to one embodiment of the present invention, the presulfurization step can be carried out in a manner known in the art. For example, as the reaction conditions of said pre-sulfurization step, for example, the conditions include the sulfurization pressure is 3.2-6.4 MPa, the sulfurization temperature is 250-400° C., the sulfurization time is 4-12 hours, and the used amount of the sulfurizing agent is 1.1-2.0 times the theoretical amount.

According to one embodiment of the present invention, various sulfurizations as described above may be carried out in any manner conventionally known in the art, and in particular dry sulfurization or wet sulfurization can be enumerated. By way of example, the sulfurizing agent for dry sulfurization is typically hydrogen sulfide, and the sulfurizing agent for wet sulfurization is typically selected from one or more of carbon disulfide, dimethyl disulfide, methyl sulfide, and n-butyl sulfide.

According to one embodiment of the present invention, the hydrogenation step may be carried out in a manner known in the art. For example, as the reaction conditions of the hydrogenation step, for example, the conditions include the hydrogen/oil volume ratio is 50:1-800:1, the catalyst/oil volumic ratio is 0.25:1-2.0:1, the reaction pressure is 4.0-10.0 MPaG, the reaction temperature is 300-400° C., and the volumetric space velocity is 0.5-4.0 $h^{-1}$.

EXAMPLES

The present invention will be described in further detail with reference to examples, but the present invention is not limited to these examples.

In the following examples and comparative examples, all the agents and raw materials are either commercially available or are manufactured according to the prior knowledge.

Example 1

17.6 g of $(NH_4)_6Mo_7O_{24}*4H_2O$ was adjusted with ammonia water until ammonium molybdate was completely dissolved, diluted to a constant volume of 100 mL by volumetric flask, then isometrically impregnated to an alumina support, and dried at 120° C. for 3 hours. Then, the sulfuration treatment was carried out with a hydrogen gas containing 1.5% of $H_2S$, wherein the sulfuration temperature was 350° C., the sulfuration pressure was 4.0 MPa, and the sulfuration time was 8 hours, and then the temperature was reduced to room temperature in an $N_2$ atmosphere to produce $MoS_2/Al_2O_3$·9.31 g of $Co(NO_3)_2$*$6H_2O$ was dissolved in 50 mL of deionized water, and the solution was isometrically impregnated to $MoS_2/Al_2O_3$ in an $N_2$ atmosphere, and then dried at 90° C. for 4 hours and calcined at 300° C. for 3 hours under an $N_2$ atmosphere to produce a catalyst C-1 $MoS_2$—$CoO/Al_2O_3$, wherein the Mo content was 12.5% and the Co content was 4.2%.

Example 2

17.6 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to an alumina support, and dried at 120° C. for 3 hours. Then, the sulfuration treatment was carried out with a hydrogen gas containing 1.5% of $H_2S$, wherein the sulfuration temperature was 350° C., the sulfuration pressure was 4.0 MPa, and the sulfuration time was 8 hours, and then the temperature was reduced to room temperature in an $N_2$ atmosphere to produce $MoS_2/Al_2O_3$·9.31 g of $Ni(NO_3)_2$*$6H_2O$ was dissolved in 50 mL of deionized water, and the solution was isometrically impregnated to $MoS_2/Al_2O_3$ in an $N_2$ atmosphere, and then dried at 90° C. for 4 hours and calcined at 300° C. for 3 hours under an $N_2$ atmosphere to produce a catalyst C-2 $MoS_2$—$NiO/Al_2O_3$, wherein the Mo content was 12.5% and the Ni content was 4.2%.

Example 3

17.6 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to an alumina support, and dried at 120° C. for 3 hours. Then, the sulfuration treatment was carried out with a hydrogen gas containing 1.5% of $H_2S$, wherein the sulfuration temperature was 350° C., the sulfuration pressure was 4.0 MPa, and the sulfuration time was 8 hours, and then the temperature was reduced to room temperature in an $N_2$ atmosphere to produce $MoS_2/Al_2O_3$·5.11 g of $Ni(NO_3)_2$*$6H_2O$ and 4.25 g of $Co(NO_3)_2$*$6H_2O$ were dissolved in 50 mL of deionized water, and the solution was isometrically impregnated to $MoS_2/Al_2O_3$ in an $N_2$ atmosphere, and then dried at 90° C. for 4 hours and calcined at 300° C. for 3 hours under an $N_2$ atmosphere to produce a catalyst C-3 $MoS_2$—$NiO$—$CoO/Al_2O_3$, wherein the Mo content was 12.5%, the Co content was 3.2% and the Ni content was 3.8%.

Example 4

17.6 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to a silica-modified alumina support (wherein the content by mass of silica in the support was 8%), and dried at 120° C. for 3 hours. Then, the sulfuration treatment was carried out with a hydrogen gas containing 1.5% of $H_2S$, wherein the sulfuration temperature was 350° C., the sulfuration pressure was 4.0 MPa, and the sulfuration time was 8 hours, and then the temperature was reduced to room temperature in an $N_2$ atmosphere to produce $MoS_2/Al_2O_3$·9.31 g of $Co(NO_3)_2$*$6H_2O$ was dissolved in 50 mL of deionized water, and the solution was isometrically impregnated to $MoS_2/Al_2O_3$ in an $N_2$ atmosphere, and then dried at 90° C. for 4 hours and calcined at 300° C. for 3 hours under an $N_2$ atmosphere to produce a catalyst C-4 $MoS_2$—$CoO/SiO_2$—$Al_2O_3$, wherein the Mo content was 12.5% and the Co content was 4.2%.

Example 5

Figure 3:
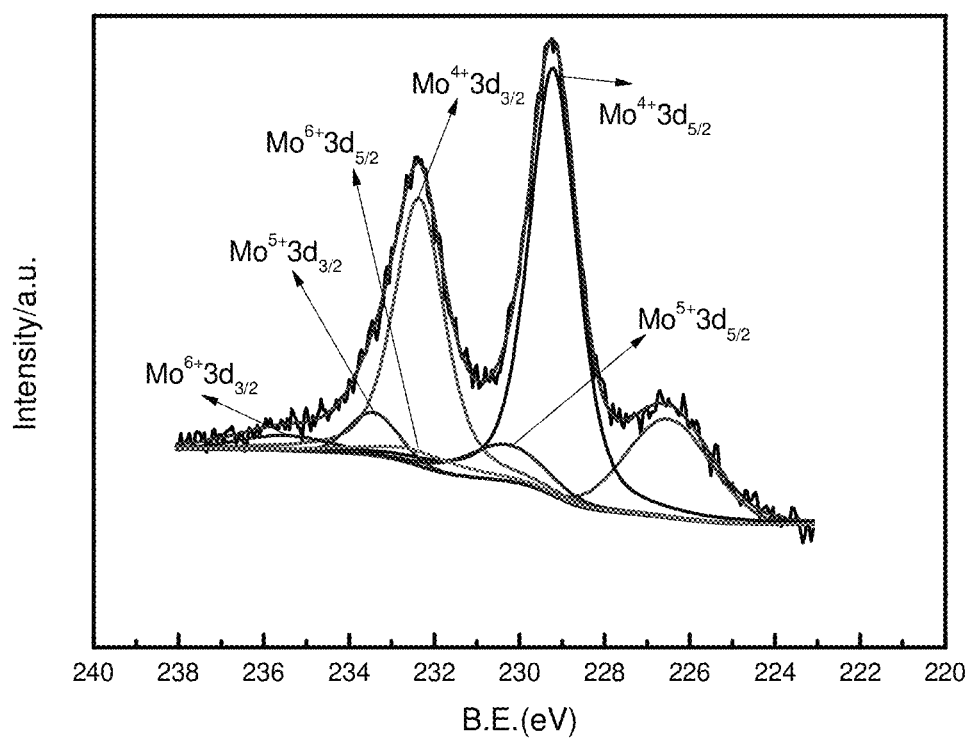
FIG. 3 is an X-ray electron energy spectrum of the catalyst according to Example 5 of the present application.

22.6 g of $(NH_4)_6Mo_7O_{24}$*$4H_2O$ and 8.2 g of glycerol were adjusted with ammonia water until ammonium molybdate was completely dissolved, diluted to a constant volume of 100 mL by volumetric flask, then isometrically impregnated to a silica-modified alumina support (wherein the content by mass of silica in the support was 8%), and dried at 120° C. for 3 hours. Then, the sulfuration treatment was carried out with an aviation kerosene containing 3 wt % of $CS_2$ for 8 hours under the operation pressure of 5.0 MPa with the space velocity of 1.0 $h^{-1}$ and the hydrogen/oil volume ratio of 500:1, and then the temperature was reduced to room temperature in an $N_2$ atmosphere to produce $MoS_2/SiO_2$—$Al_2O_3$·9.31 g of $Co(NO_3)_2$*$6H_2O$ and 2.9 g of allyl alcohol were dissolved in 50 mL of deionized water, and the solution was isometrically impregnated to $MoS_2/SiO_2$—$Al_2O_3$ in an $N_2$ atmosphere, and then dried at 90° C. for 4 hours and calcined at 300° C. for 3 hours under an $N_2$ atmosphere to produce a catalyst C-5 $MoS_2$—$CoO/SiO_2$—$Al_2O_3$, wherein the Mo content was 16.1% and the Ni content was 4.2%. The high-resolution transmission electron microscope photograph of the catalyst was shown in FIG. 1, and the X-ray electron energy spectrum was shown in FIG. 3.

Example 6

17.6 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to a boron oxide-modified alumina support (wherein the content by mass of boron oxide in the support was 5%), and dried at 120° C. for 3 hours. Then, the sulfuration treatment was carried out with an aviation kerosene containing 3 wt % of $CS_2$ for 8 hours under the operation pressure of 5.0 MPa with the space velocity of 1.0 $h^{-1}$ and the hydrogen/oil volume ratio of 400:1, and then the temperature was reduced to room temperature in an $N_2$ atmosphere to produce $MoS_2/B_2O_3$—$Al_2O_3$·9.31 g of $Co(NO_3)_2$*$6H_2O$ was dissolved in 50 mL of deionized water, and the solution was isometrically impregnated to $MoS_2/B_2O_3$—$Al_2O_3$ in an $N_2$ atmosphere, and then dried at 90° C. for 4 hours and calcined at 300° C. for 3 hours under an $N_2$ atmosphere to produce a catalyst C-6 $MoS_2$—$CoO/B_2O_3$—$Al_2O_3$, wherein the Mo content was 12.5% and the Co content was 4.2%.

Example 7

17.6 g of $(NH_4)_6Mo_7O_{24}$*$4H_2O$ and 10.5 g of citric acid were adjusted with ammonia water until ammonium molybdate was completely dissolved, diluted to a constant volume of 100 mL by volumetric flask, then isometrically impregnated to an alumina support, and dried at 110° C. for 3 hours. Then, the sulfuration treatment was carried out with an aviation kerosene containing 3 wt % of $CS_2$ for 6 hours under the operation pressure of 6.0 MPa with the space velocity of 1.0 $h^{-1}$ and the hydrogen/oil volume ratio of 400:1, and then the temperature was reduced to room temperature in an $N_2$ atmosphere to produce $MoS_2/Al_2O_3$·9.31 g of $Ni(NO_3)_2$*$6H_2O$ was dissolved in 50 mL of deionized water, and the solution was isometrically impregnated to $MoS_2/Al_2O_3$ in an $N_2$ atmosphere, and then dried at 100° C. for 4 hours and calcined at 250° C. for 3 hours under an $N_2$ atmosphere to produce a catalyst C-7 $MoS_2$—NiO/$Al_2O_3$, wherein the Mo content was 12.5% and the Ni content was 4.2%.

Example 8

17.6 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to an alumina support, and dried at 110° C. for 3 hours. Then, the sulfuration treatment was carried out with an aviation kerosene containing 3 wt % of $CS_2$ for 6 hours under the operation pressure of 6.0 MPa with the space velocity of 1.0 $h^{-1}$ and the hydrogen/oil volume ratio of 500:1, and then the temperature was reduced to room temperature in an $N_2$ atmosphere to produce $MoS_2/Al_2O_3$·9.31 g of $Ni(NO_3)_2$*$6H_2O$ and 3.1 g of citric acid were dissolved in 50 mL of deionized water, and the solution was isometrically impregnated to $MoS_2/Al_2O_3$ in an $N_2$ atmosphere, and then dried at 100° C. for 4 hours and calcined at 250° C. for 3 hours under an $N_2$ atmosphere to produce a catalyst C-8 $MoS_2$—NiO/$Al_2O_3$, wherein the Mo content was 12.5% and the Ni content was 4.2%.

Example 9

17.6 g of $(NH_4)_6Mo_7O_{24}$*$4H_2O$ and 6.2 g of glycerol were adjusted with ammonia water until ammonium molybdate was completely dissolved, diluted to a constant volume of 100 mL by volumetric flask, then isometrically impregnated to a phosphorus-modified alumina support (wherein the content by mass of phosphorus pentoxide in the support was 5%), and dried at 110° C. for 3 hours. Then, the sulfuration treatment was carried out with an aviation kerosene containing 3 wt % of $CS_2$ for 10 hours under the operation pressure of 6.4 MPa with the space velocity of 1.0 $h^{-1}$ and the hydrogen/oil volume ratio of 400:1, and then the temperature was reduced to room temperature in an $N_2$ atmosphere to produce $MoS_2/P_2O_5$—$Al_2O_3$·9.31 g of $Ni(NO_3)_2$*$6H_2O$ and 1.2 g of ethylene glycol were dissolved in 50 mL of deionized water, and the solution was isometrically impregnated to $MoS_2/P_2O_5$—$Al_2O_3$ in an $N_2$ atmosphere, and then dried at 90° C. for 4 hours and calcined at 250° C. for 3 hours under an $N_2$ atmosphere to produce a catalyst C-9 $MoS_2$—NiO/$P_2O_5$—$Al_2O_3$, wherein the Mo content was 12.5% and the Ni content was 4.2%.

Example 10

17.6 g of $(NH_4)_6Mo_7O_{24}$*$4H_2O$ and 14.5 g of ethylenediamine tetraacetic acid were adjusted with ammonia water until ammonium molybdate was completely dissolved, diluted to a constant volume of 100 mL by volumetric flask, then isometrically impregnated to an alumina support, and dried at 110° C. for 3 hours. Then, the sulfuration treatment was carried out with an aviation kerosene containing 3 wt % of $CS_2$ for 10 hours under the operation pressure of 6.4 MPa with the space velocity of 3.0 $h^{-1}$ and the hydrogen/oil volume ratio of 600:1, and then the temperature was reduced to room temperature in an $N_2$ atmosphere to produce $MoS_2/Al_2O_3$·9.31 g of $Co(NO_3)_2$*$6H_2O$ was dissolved in 50 mL of deionized water, and the solution was isometrically impregnated to $MoS_2/Al_2O_3$ in an $N_2$ atmosphere, and then dried at 90° C. for 4 hours and calcined at 250° C. for 3 hours under an $N_2$ atmosphere to produce a catalyst C-10 $MoS_2$—CoO/$Al_2O_3$, wherein the Mo content was 12.5% and the Co content was 4.2%.

Example 11

17.6 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to a phosphorus-modified alumina support (wherein the content by mass of phosphorus pentoxide in the support was 8%), and dried at 110° C. for 3 hours. Then, the sulfuration treatment was carried out with an aviation kerosene containing 3 wt % of $CS_2$ for 10 hours under the operation pressure of 6.4 MPa with the space velocity of 1.0 $h^{-1}$ and the hydrogen/oil volume ratio of 400:1, and then the temperature was reduced to room temperature in an $N_2$ atmosphere to produce $MoS_2/P_2O_5$—$Al_2O_3$·9.31 g of $Ni(NO_3)_2$*$6H_2O$ and 1.8 g of glucose were dissolved in 50 mL of deionized water, and the solution was isometrically impregnated to $MoS_2/P_2O_5$—$Al_2O_3$ in an $N_2$ atmosphere, and then dried at 90° C. for 4 hours and calcined at 300° C. for 3 hours under an $N_2$ atmosphere to produce a catalyst C-11 $MoS_2$—NiO/$P_2O_5$—$Al_2O_3$, wherein the Mo content was 12.5% and the Ni content was 4.2%.

Example 12

45.6 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to an alumina support, and dried at 120° C. for 3 hours. Then, the sulfuration treatment was carried out with a hydrogen gas containing 1.5% of $H_2S$, wherein the sulfuration temperature was 360° C., the sulfuration pressure was 4.6 MPa, and the sulfuration time was 8 hours, and then the temperature was reduced to room temperature in an $N_2$ atmosphere to produce $MoS_2/Al_2O_3$·9.31 g of $Ni(NO_3)_2$*$6H_2O$ was dissolved in 50 mL of deionized water, and the solution was isometrically impregnated to $MoS_2/Al_2O_3$ in an $N_2$ atmosphere, and then dried at 90° C. for 4 hours and calcined at 300° C. for 3 hours under an $N_2$ atmosphere to produce a catalyst C-12 $MoS_2$—NiO/$Al_2O_3$, wherein the Mo content was 32.7% and the Ni content was 4.2%.

Example 13

38.8 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to an alumina support, and dried at 120° C. for 3 hours. Then, the sulfuration treatment was carried out with a hydrogen gas containing 1.5% of $H_2S$, wherein the sulfuration temperature was 350° C., the sulfuration pressure was 6.0 MPa, and the sulfuration time was 4 hours, and then the temperature was reduced to room temperature in an $N_2$ atmosphere to produce $MoS_2/Al_2O_3$·25.7 g of $Co(NO_3)_2$*$6H_2O$ was dissolved in 50 mL of deionized water, and the solution was isometrically impregnated to $MoS_2/Al_2O_3$ in an $N_2$ atmosphere, and then dried at 90° C. for 4 hours and calcined at 300° C. for 3 hours under an $N_2$ atmosphere to produce a catalyst C-13 $MoS_2$—$NiO/Al_2O_3$, wherein the Mo content was 26.8% and the Co content was 11.6%.

Example 14

38.8 g of $(NH_4)_6Mo_7O_{24}$*$4H_2O$ and 15 g of glycerol were adjusted with ammonia water until ammonium molybdate was completely dissolved, diluted to a constant volume of 100 mL by volumetric flask, then isometrically impregnated to an alumina support, and dried at 120° C. for 3 hours. Then, the sulfuration treatment was carried out with a hydrogen gas containing 1.5% of $H_2S$, wherein the sulfuration temperature was 350° C., the sulfuration pressure was 6.0 MPa, and the sulfuration time was 4 hours, and then the temperature was reduced to room temperature in an $N_2$ atmosphere to produce $MoS_2/Al_2O_3$·24.6 g of Co$(NO_3)_2$*$6H_2O$ and 13.6 g of citric acid were dissolved in 50 mL of deionized water, and the solution was isometrically impregnated to $MoS_2/Al_2O_3$ in an $N_2$ atmosphere, and then dried at 90° C. for 4 hours and calcined at 300° C. for 3 hours under an $N_2$ atmosphere to produce a catalyst C-14 $MoS_2$—$NiO/Al_2O_3$, wherein the Mo content was 26.1% and the Co content was 11.1%.

Comparative Example 1

17.6 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to an alumina support, dried at 120° C. for 3 hours, and calcined at 400° C. for 3 hours to produce $MoO_3/Al_2O_3$. Then 9.31 g of $Co(NO_3)_2$*$6H_2O$ was dissolved in 50 mL of deionized water, and the solution was isometrically impregnated to $MoO_3/Al_2O_3$, and then dried at 90° C. for 4 hours and calcined at 300° C. for 3 hours to produce a catalyst DC-1 $MoO_3$—$CoO/Al_2O_3$.

Comparative Example 2

17.6 g of $(NH_4)_6Mo_7O_{24}$*$4H_2O$ was adjusted with phosphoric acid until ammonium molybdate was completely dissolved, then 9.31 g of $Co(NO_3)_2$*$6H_2O$ was added, after the completed is solution, the solution was diluted to a constant volume of 100 mL by volumetric flask, then isometrically impregnated to an alumina support, dried at 120° C. for 3 hours, and calcined at 400° C. for 3 hours to produce a catalyst DC-2 $MoO_3$—$CoO/Al_2O_3$.

Comparative Example 3

Figure 2:
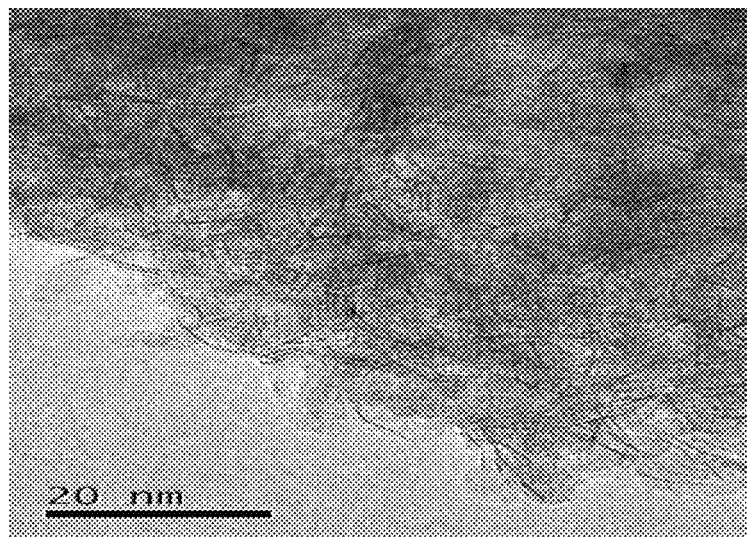
FIG. 2 is a high resolution transmission electron microscope photograph of the catalyst according to Comparative Example 3 of the present application.
Figure 4:
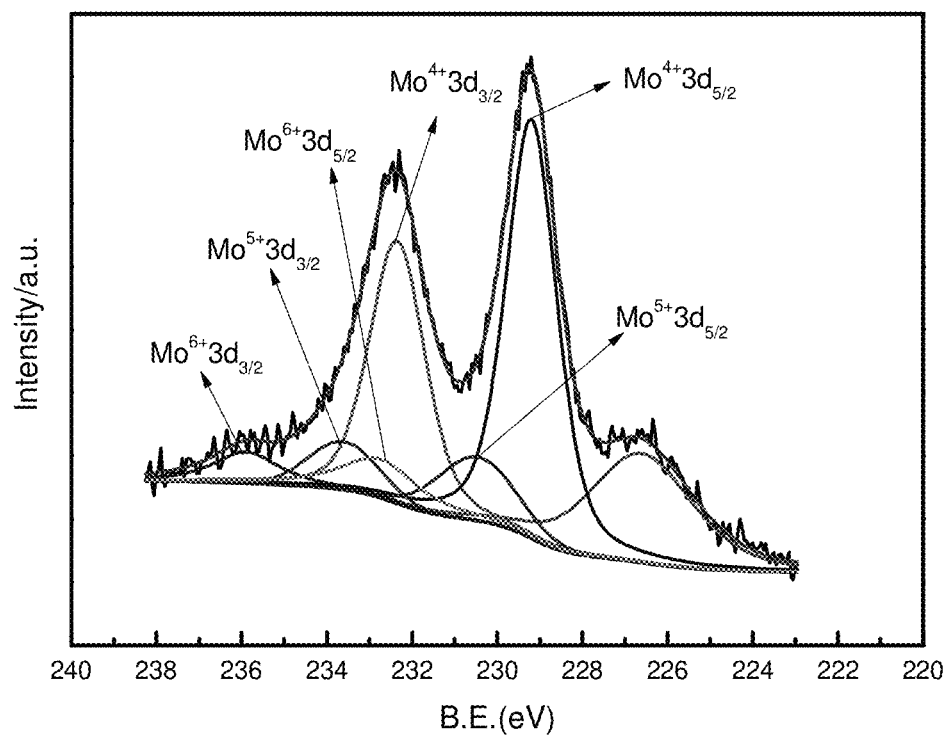
FIG. 4 is an X-ray electron energy spectrum of the catalyst according to Comparative Example 3 of the present application.

21.2 g of $(NH_4)_6Mo_7O_{24}$*$4H_2O$ was adjusted with ammonia water until ammonium molybdate was completely dissolved, diluted to a constant volume of 100 mL by volumetric flask, then isometrically impregnated to a silica-modified alumina support, dried at 120° C. for 3 hours, and calcined at 500° C. for 3 hours in an air atmosphere. Then, the sulfuration treatment was carried out with a hydrogen gas containing 1.5% of $H_2S$, wherein the sulfuration temperature was 360° C., the sulfuration pressure was 3.2 MPa, and the sulfuration time was 8 hours, and then the temperature was reduced to room temperature in an $N_2$ atmosphere to produce $MoS_2/Al_2O_3$. Then 10.2 g of $Co(NO_3)_2$*$6H_2O$ was dissolved in 50 mL of deionized water, and the solution was isometrically impregnated to $MoS_2/Al_2O_3$ in an $N_2$ atmosphere, and then dried at 90° C. for 4 hours and calcined at 300° C. for 3 hours under an $N_2$ atmosphere to produce a catalyst DC-3$MoS_2$—$CoO/SiO_2$—$Al_2O_3$. The high-resolution transmission electron microscope photograph of the catalyst was shown in FIG. 2, and the X-ray electron energy spectrum was shown in FIG. 4.

Example 15

This example demonstrated the hydrodesulfurization reaction performance of the catalyst provided by the present invention on the diesel fuel.

The feedstock oil used for evaluation was a mixed diesel oil (sulfur content: 14200 μg/g) supplied from a refinery of the SINOPEC.

Hydrogenation reaction performance evaluation was performed on the catalysts C-1 to C-14 and comparative examples DC-1 to DC-3 respectively by using a 200 mL fixed bed liquid phase circulating hydrogenation apparatus.

Presulfurizing conditions of the catalyst: the catalyst was presulfided with aviation kerosene containing 4 wt % of $CS_2$ at a space velocity of 1.0 $h^{-1}$ and a hydrogen/oil volume ratio of 550:1 under an operating pressure of 5.0 MPa.

The presulfurization process was as follows: an oil to be presulfurized was fed at 120° C. for 2 hours, sulfurized at constant temperature for 2 hours, heated to 150° C. at 15° C./h, sulfurized at constant temperature for 4 hours, heated to 230° C. at 6° C./h, sulfurized at constant temperature for 10 hours, heated to 290° C. at 6° C./h, sulfurized at constant temperature for 6 hours, heated to 330° C. at 12° C./h, sulfurized at constant temperature for 6 hours, and finally naturally cooled to 200° C. to finish the presulfurization.

The reaction conditions for the evaluation were: the operation pressure was 11.0 MPa, the reaction temperature was 360° C., the circulating ratio was 3, the volumetric space velocity of the fresh feedstock was 1.5 $h^{-1}$, and the mixing with hydrogen gas was performed for three times. The hydrogenation evaluation result is shown in Table 1 and characterized with the desulfurization effect. In addition, Table 1 also provided the numerical values A/B, the molar ratios of Mo in the +4 valent state to the total of Mo of the hydrogenation catalyst (in the oxidation state) (namely $Mo^{4+}$ content), the molar ratios of Mo in the +4 valent state to the total of Mo of the hydrogenation catalyst (in the sulfurization state) (namely $Mo^{4+}$ content), and the molar ratios of 3-5 layers in stack of Mo sulfide to the total of Mo of the hydrogenation catalyst (in the sulfurization state) (namely the proportion of 3-5 layers in stack), as measured in each of examples and comparative examples.

TABLE 1

Properties and the evaluation results for catalysts

| Catalyst number | A/B, % | Proportion of 3-5 layers in stack, % | Mo⁴⁺ content, % (in the oxidation state) | Mo⁴⁺ content, % (in the sulfurization state) | Sulfur content, μg/g |
|---|---|---|---|---|---|
| Testing method | Q/SHFRIPP FSEM7 | Q/SHFRIPP FTEM10 | Q/SHFRIPP XPS001-003A | Q/SHFRIPP XPS001-003A | Q/SHFRIPP 040024-2001 |
| C-1 | 60 | 60 | 60 | 69 | 9.6 |
| C-2 | 64 | 63 | 63 | 65 | 9.9 |
| C-3 | 63 | 65 | 64 | 68 | 9.6 |
| C-4 | 70 | 72 | 68 | 70 | 8.1 |
| C-5 | 82 | 75 | 76 | 81 | 4.6 |
| C-6 | 65 | 65 | 70 | 73 | 8.6 |
| C-7 | 72 | 73 | 76 | 79 | 5.5 |
| C-8 | 73 | 73 | 77 | 82 | 4.3 |
| C-9 | 89 | 81 | 79 | 85 | 3.8 |
| C-10 | 69 | 67 | 73 | 77 | 6.7 |
| C-11 | 68 | 67 | 74 | 76 | 6.9 |
| C-12 | 62 | 62 | 60 | 61 | 14.6 |
| C-13 | 60 | 59 | 59 | 60 | 15.8 |
| C-14 | 65 | 66 | 61 | 62 | 10.7 |
| DC-1 | 39 | 19 | 48 | 50 | 89.1 |
| DC-2 | 45 | 22 | 52 | 53 | 56.5 |
| DC-3 | 52 | 35 | 53 | 54 | 54.2 |

The evaluation results in Table 1 can show that the catalysts of the present invention have a higher sulfurization degree for active metals and have a higher proportion of class II active centers. In addition, the catalyst of the present invention shows a higher desulfurization performance when being used for the hydrotreatment of the oil product.

The invention claimed is:

1. A process for preparing a hydrogenation catalyst, wherein said hydrogenation catalyst comprises a hydrogenation catalyst support and a hydrogenation active component, wherein said hydrogenation active component comprises a sulfide of the metal of Group VIB and a compound of the metal of Group VIII,
the process comprises the following steps:
(1) impregnating the hydrogenation catalyst support with a first impregnation solution containing the metal of Group VIB, and then drying, sulfurizing without calcination to obtain a sulfurized material; and
(2) impregnating the sulfurized material with a second impregnation solution containing the metal of Group VIII, and optionally subsequently drying and/or calcining to obtain the hydrogenation catalyst,
wherein the first impregnation solution further contains a first auxiliary selected from an organic acid having at least two carboxyl groups, an organic alcohol having at least three hydroxy groups, and a mixture thereof,
wherein the second impregnation solution further contains a second auxiliary selected from an organic acid having at least two carboxyl groups, an organic alcohol having at least one double bond, an organic alcohol having at least two hydroxy groups, and mixtures thereof,
and
wherein said hydrogenation catalyst, based on SEM-EDX measurements, has A/B=60-100%, assuming that a molar ratio of said metal of Group VIII (as an element of the metal of Group VIII) to said metal of Group VIB (as an element of the metal of Group VIB), as measured upon observing the region where said sulfide of the metal of Group VIB is present, is A, and that the molar ratio of said metal of Group VIII (as the element of the metal of Group VIII) to said metal of Group VIB (as the element of the metal of Group VIB) of said hydrogenation catalyst is B.

2. The preparation process of claim 1, wherein in step (1), a mass concentration of the element of said metal of Group VIB in said first impregnation solution is 0.1 g/mL-2.0 g/mL, and/or, in step (2) the mass concentration of the element of said metal of Group VIII (as the element of the metal of Group VIII) in said second impregnation solution is 0.1 g/mL-1.0 g/mL, and/or, said first impregnation solution is used in such an amount that, based on the total weight of the hydrogenation catalyst, the content by weight percent of said metal of Group VIB is 1.3-20%, and/or, said second impregnation solution is used in such an amount that based on the total weight of the hydrogenation catalyst, the content by weight percent of said metal of Group VIII is 0.16-9.5%.

3. The preparation process of claim 1, wherein in step (1), the drying conditions comprise: the drying temperature is 90-200° C., the drying time is 3-6 hours, and/or, in step (1), the sulfurization conditions comprise: dry sulfurization or wet sulfurization, the sulfurization pressure is 3.2-6.4 MPaG, the sulfurization temperature is 250-400° C., the sulfurization time is 4-12 hours, and an amount of a sulfurizing agent is 1.1-2.0 times the theoretical amount.

4. The preparation process of claim 1, wherein step (2) comprises drying under an inert atmosphere selected from an N₂ atmosphere, an inert gas atmosphere, and a mixed atmosphere thereof at 20-90° C. for 4-16 hours, and/or, step (2) comprises calcination under an inert atmosphere selected from an N₂ atmosphere, an inert gas atmosphere, and a mixed atmosphere thereof at 200-500° C. for 2-5 hours.

5. The preparation process of claim 1, wherein in step (1), said first impregnation solution has a molar ratio of said first auxiliary to said metal of Group VIB of 0.1-2.0, and
wherein in step (2), said second impregnation solution has a molar ratio of said second auxiliary to said metal of Group VIII is 0.1-2.0.

6. The preparation process of claim 5, the molar ratio of said first auxiliary to an element of said metal Group VIB is 0.2-0.8, and/or the molar ratio of said second auxiliary to an element of said metal Group VIII is 0.2-0.8.

7. The preparation process of claim 1, wherein said metal of Group VIB is selected from at least one of Mo and W, said metal of Group VIII is selected from at least one of Co and Ni, and/or, wherein the hydrogenation catalyst support is a porous inorganic refractory oxide, and/or, wherein the hydrogenation catalyst support is modified with one or more modifying elements selected from B, P, and F and said one or more modifying elements content is 0.5 wt %-10 wt % based on the weight of the modified hydrogenation catalyst support.

8. The preparation process of claim 7, wherein the porous inorganic refractory oxide is selected from one or more of silica, alumina, magnesia, zirconia, titania, silica-alumina, silica-magnesia, and alumina-magnesia.

9. The preparation process of claim 1, wherein in step (1), said organic acid having the at least two carboxyl groups for the first auxiliary is at least one selected from citric acid and ethylenediamine tetraacetic acid, and said organic alcohol having at least three hydroxy groups for the first auxiliary is at least one selected from glycerol and glucose.

10. The preparation process of claim 1, wherein in step (2), said organic acid having the at least two carboxyl groups for the second auxiliary is at least one selected from citric acid and ethylenediamine tetraacetic acid, said organic alcohol having the at least one double bond for the second auxiliary is allyl alcohol, and said organic alcohol having the at least two hydroxy groups for the second auxiliary is at least one selected from ethylene glycol, glycerol, and glucose.

\* \* \* \* \*